United States Patent
Kim

(10) Patent No.: US 7,171,050 B2
(45) Date of Patent: Jan. 30, 2007

(54) SYSTEM ON CHIP PROCESSOR FOR MULTIMEDIA DEVICES

(75) Inventor: Jae-hyun Kim, Suwon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 739 days.

(21) Appl. No.: 10/361,677

(22) Filed: Feb. 11, 2003

(65) Prior Publication Data

US 2003/0179939 A1    Sep. 25, 2003

(30) Foreign Application Priority Data

Mar. 19, 2002 (KR) ............................ 2002-14846

(51) Int. Cl.
*G06K 9/36* (2006.01)
(52) U.S. Cl. .................... 382/232; 382/233
(58) Field of Classification Search ............... 382/232, 382/233, 298, 167, 249, 269; 348/273, 280, 348/581; 375/240.25; 345/419, 442, 440, 345/947; 358/1.9
See application file for complete search history.

(56) References Cited

U.S. PATENT DOCUMENTS

| 5,473,742 | A | * | 12/1995 | Polyakov et al. ............ 345/422 |
|---|---|---|---|---|
| 5,657,358 | A | * | 8/1997 | Panech et al. ............... 375/356 |
| 5,754,697 | A | * | 5/1998 | Fu et al. ...................... 382/232 |
| 6,044,157 | A | * | 3/2000 | Uesaka et al. ............... 380/201 |
| 6,373,986 | B1 | * | 4/2002 | Fink ............................ 382/232 |
| 6,525,722 | B1 | * | 2/2003 | Deering ....................... 345/419 |
| 6,754,279 | B2 | * | 6/2004 | Zhou et al. ............. 375/240.28 |
| 6,791,609 | B2 | * | 9/2004 | Yamauchi et al. ........... 348/273 |

FOREIGN PATENT DOCUMENTS

JP            363149768 A    *  6/1988

* cited by examiner

*Primary Examiner*—Anh Hong Do
(74) *Attorney, Agent, or Firm*—Staas & Halsey LLP

(57) ABSTRACT

A system on chip processor for a multimedia device includes: a pre-processing circuit to convert an external image signal into a compressed input signal for compressing; an encoder/decoder circuit to generate compressed data by compressing the compressed input signal and outputting a coded image signal by decompressing the compressed data; a post-processing circuit to convert the coded image signal into a signal that can be used by an image displaying device; a first system bus connected with pre-processing circuit and post-processing circuit; a second system bus connected with the encoder/decoder circuit; a first bridge DMA circuit to mutually transmit data between first system bus and second system bus; and a controller to control the operation of the circuits.

19 Claims, 2 Drawing Sheets

SYSTEM ON CHIP PROCESSOR FOR MULTIMEDIA DEVICES

CROSS-REFERENCE TO RELATED APPLICATIONS

This application claims the benefit of Korean Application No. 2002-14846, filed Mar. 19, 2002, in the Korean Intellectual Property Office, the disclosure of which is incorporated herein by reference.

BACKGROUND OF THE INVENTION

1. Field of the Invention

The present invention relates to a system on chip (SOC) processor, and more particularly, to an SOC processor for a multimedia device.

2. Description of the Related Art

Recently, as multimedia services diversify, various multimedia devices such as mobile phones, PDAs, digital TVs, and DVD players (DVDPs) have been introduced, and the concerns about a processor for a multimedia device have increased.

The processor for a particular multimedia device has various functions, such as image processing, controlling an LCD (liquid-crystal display) or CRT (cathode-ray tube), and controlling hardware and peripheral devices for a video CODEC (coder-decoder). Furthermore, the processor for the multimedia device has been developed as a form of an SOC processor, as there is a need for reducing the cost and the size of the SOC processor.

An SOC processor means an IC (integrated circuit) having a microprocessor, a built-in memory, a plurality of peripheral device controllers, and an external bus interface located on a single chip. Due to the development of the SOC processor, the size of the system can be reduced, the time for system testing is shortened, the reliability of the system is improved, and the product can be launched in the market faster than before.

The SOC processor for the multimedia device is one that includes circuits for performing various functions required by a multimedia device in a single chip. The SOC processor for the multimedia device has been developed from a structure having a circuit of one function such as a DCT (discrete cosine transform) or an ME (motion estimator) to a structure having an SRAM (Static RAM) or a boot ROM (read only memory). Moreover, the SOC processor for the multimedia device has been developed for a chip having a built-in SDRAM (Synchronous DRAM) with vast capacity, and more functions are required due to subsequent technical developments.

However, in the process of designing the SOC processor for the multimedia device, the method of mainly using the microprocessor made by the existing semiconductor manufacturers and adding circuits for required functions can be considered rather than the method of designing an entire processor. In other words, a RISC (reduced instruction set computer) microprocessor (ARM) or a CISC (complex instruction set computer) CPU of x86 (INTEL) or 68k (MOTOROLA) can be used as a main controller in the SOC processor.

Generally, a regulation provided by a semiconductor manufacturer that developed a microprocessor is used as a regulation of a system bus that is used as a common communication path by being connected with the main elements in the system such as a microprocessor, a memory, and an input/output device. A developer can reduce the burden of the design in relation to the external interface and shorten the period of developing the SOC processor by designing the SOC based on the decided regulation.

Yet, in the process of adding various functions for processing on the multimedia device, there is bound to be a difference in the speed of a clock and the processing speed used in the circuits for performing each function. Therefore, when the circuits use a signal common system bus, the operation of the entire system is set with the processing time of a circuit having the slowest processing time or the stand-by status of the circuit having a fast processing time is extended, thus the efficiency of the entire system deteriorates.

Accordingly, for effective design to overcome the difference of the processing time of the circuits, it is preferable that groups of circuits having similar processing time are formed, and that each group uses a separate system bus.

Furthermore, when an unexpected case is encountered, there should be a new system bus appropriate to the new case. In that case, a device for interfacing between the system bus of the existing semiconductor manufacturer and a new designed system bus is required.

SUMMARY OF THE INVENTION

Accordingly, it is an aspect of the present invention to provide, within a relatively short time period, an SOC processor for a multimedia device that is developed using an existing microprocessor, which is provided with plural independent system buses of different speeds and an appropriate interfacing means among the respective system buses, thereby having advantages in terms of performance and power consumption and also being multi-functional.

Additional aspects and advantages of the present invention will be set forth in part in the description that follows and, in part, will be obvious from the description, or may be learned by practicing the present invention.

The above aspect is accomplished by an SOC processor for a multimedia device according to the present invention, including a pre-processing circuit to convert an external image signal into a compressed input signal for compressing; an encoder/decoder circuit to generate compressed data by compressing the compressed input signal and to output a coded image signal by decompressing the compressed data; a post-processing circuit to convert the coded image signal into a signal that can be used by an image displaying device; a first system bus connected to the pre-processing circuit and the post-processing circuit; a second system bus connected to the encoder/decoder circuit; a first bridge direct memory access (DMA) circuit to mutually transmit data between the first system bus and the second system bus; and a controller to control the operation of the above circuits.

Further provided are a plurality of peripheral device controllers to control peripheral devices; a peripheral bus connected with the plurality of peripheral device controllers; and a second bridge DMA circuit to mutually transmit data between the first system bus and the peripheral bus. The plurality of peripheral device controllers can include a TIMER controller, an RTC controller, an Interrupt controller, a PCMCIA/CF controller, an MMC/SD controller, an MS (memory stick) controller, a GPIO controller, a UART (universal asynchronous receiver transmitter) controller, a USB (universal serial bus controller, an IrDA (infrared data association) controller, an I2C (inter IC control) controller, an Ethernet controller, an AC'97 (audio coder '97) controller, a Flash memory controller, an SSP controller, and a PS2 controller.

Each controller can include: a first system bus controller to arbitrate the use of a bus of the first system bus; and a second system bus arbiter to arbitrate the use of a bus of the second system bus. The first system bus controller can include: a microprocessor; a first system bus arbiter to arbitrate the use of the first system bus; a bus interface to interface a bus signal between the microprocessor and the first system bus arbiter; a first controller bus to connect the microprocessor and the bus interface; and a second controller bus to connect the bus interface and the first system bus arbiter. The microprocessor can be an ARM1020E (ADVANCED RISC MACHINE, LTD.), and the first controller bus can use an advanced micro-controller bus architecture (AMBA) protocol.

Further provided is a power controller to open and close a clock signal supplied to the circuits.

Further provided are a first memory controller connected with the first system bus in order to control input and output of data of an external memory; and a second memory controller connected with the second system bus in order to control input and output of the data of the external memory. The external memory can comprise an SDRAM.

Additionally, a cache memory can be connected between the controller and the first system bus, for enhancing the processing speed of the microprocessor.

The pre-processing circuit can include a pre-scaler unit to readjust a magnitude of an input image to a predetermined magnitude.

The post-processing circuit can include an LCD (liquid crystal display) controller to control display of an external LCD unit; a CRT (catrode ray tube) controller to control display of an external CRT unit; a 2D (two dimensional) graphic accelerator to process graphic related operation by realizing with hardware; and a post-scaler unit to readjust a magnitude of an output image to a predetermined magnitude.

The encoder/decoder circuit can include: a DCT (discrete cosine transform) circuit to perform a discrete cosine transform operation on the compressed input signal and output the transformed input signal; a quantization circuit to quantize a signal output from the DCT circuit and to generate a compressed data; an inverse quantization circuit to inverse quantize the compressed data and output; and an IDCT (inverse discrete cosine transform) circuit to perform an inverse discrete cosine transform operation on the signal output from the inverse quantization circuit. The encoder/decoder circuit can additionally include an ME circuit to compress the compression input signal based on a correlation between screens; and an MC circuit to decompress the compressed data regardless of the correlation between the screens, thereby improving the efficiency of image signal compression and de-compression.

BRIEF DESCRIPTION OF THE DRAWINGS

These and other aspects and advantages of the invention will become apparent and more readily appreciated from the following description of the preferred embodiments, taken in conjunction with the accompanying drawings of which.

DESCRIPTION OF THE PREFERRED EMBODIMENTS

Figure 1:
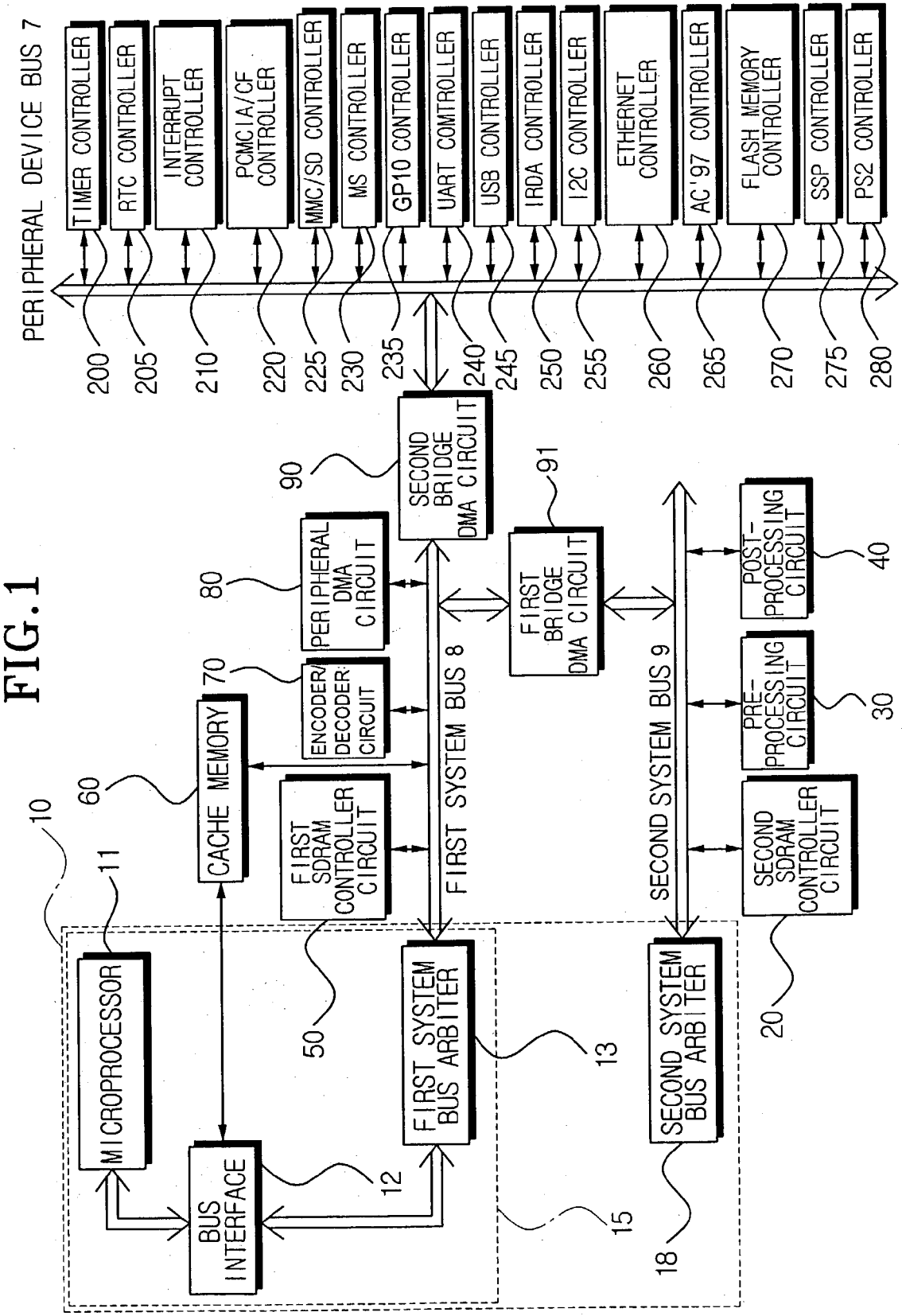
FIG. 1 is a block diagram showing important parts of An SOC processor according to embodiments of the present invention.

Reference will now be made in detail to the embodiments of the present invention, examples of which are illustrated in the accompanying drawings, wherein like reference numerals refer to like elements throughout.

FIG. 1 is a block diagram showing important parts of an SOC processor for a multimedia device, according to embodiments of the present invention.

Referring to FIG. 1, the SOC processor has a controller 10. Moreover, an internal bus has a first system bus 8 and a second system bus 9 and there is a peripheral device bus 7 so that each bus system can be operated independently.

A first SDRAM controller circuit 50, an encoder/decoder circuit 70, and a peripheral direct memory access (DMA) circuit 80 are connected to the first system bus 8. A second SDRAM controller circuit 20, a pre-process ing circuit 30 and a post-process ing circuit 40 are connected to the second system bus 9. A plurality of peripheral controllers for controlling peripheral devices are connected to the peripheral device bus 7, and a cache memory 60 is connected between the controller 10 and the first system bus 8.

A first bridge DMA circuit 91 is connected between the first system bus 8 and the second system bus 9. A second bridge DMA circuit 90 is connected between the first system bus 8 and the peripheral bus 7.

In the above structure, the controller 10 controls each circuit unit in the SOC processor. The controller 10 comprises a first system bus controller 15 and a second system bus arbiter 18, and the first system bus controller 15 comprises a microprocessor 11, a bus interface 12, a first system bus arbiter 13 and a bus to connect them. An ARM1020E of ARM (ADVANCED RISC MACHINES LTD) can be used as the microprocessor 11 of the first system bus controller 15. In this case, an AMBA (Advanced Micro-controller Bus Architecture) introduced by ARM can be used between the microprocessor 11 and the bus interface 12.

However, AMBA was designed before the memory such as SDRAM (synchronous DRAM) or RDRAM (rambus DRAM) were generally used. Thus, there is no problem using memory like an EDO RAM (extended data out RAM), but when a block access memory is used, the efficiency is reduced.

Therefore, a separate bus structure to support the block access memory is used between the bus interface 12 and the first system bus arbiter 13. Moreover, the bus interface 12 operates to provide an interface between the microprocessor 11 and the first system bus arbiter 13. In an embodiment, a DOAA (data oriented arbitration architecture) bus can be used as the bus system to support the block access memory.

The first system bus arbiter 13 of the controller 10 arbitrates the use of the bus of the first system bus 8. The second system bus arbiter 18, which is capable of dependent operating, arbitrates the use of the bus of the second system bus 9.

When there is contention in using the bus, the priority of using the bus of the first system bus arbiter 13 and the second system bus arbiter 18 can be determined using many methods. In one embodiment, the priority is given to the circuit requiring a vast amount of data.

The pre-process ing circuit 30 is connected to the second system bus 9 and produces a compressed input signal that can be compressed by a video coder after processing an external video signal. In other words, the signal input from a CMOS (complementary MOS) image sensor 305 (illustrated in FIG. 2) is converted from an RGB (red green blue)

signal into a YUV (component video) signal after gamma compensating considering the feature of an external CRT unit, and signals input after being converted into a luminance signal Y and color signals Cb and Cr can be externally processed. Moreover, ITU-R (international telecommunication union-radiocommunication sector) 601 and 605 formats can be input and a desired format can be output when outputting through the video coder.

The encoder/decoder circuit 70 connected to the first system bus 8 compresses an input signal and decompresses the compressed signal. This process requires compression of images to transmit the digital images due to the excessive size of the digital image signals, and the compressed data should be decompressed to be used later.

The encoder/decoder circuit 70 requires a lot of the system resources to realize the video CODEC that is the image compression standard such as H.263, MPEG-2, MPEG-4 and JPEG, thus the operational process is operated by the encoder/decoder circuit 70 instead of being operated by the microprocessor 11. As described, the efficiency can be improved as the operational process is operated by using a circuit realized by hardware.

The post-processing circuit 40 connected with the second system bus 9 processes video data and graphic data to be output on an external LCD unit or an external CRT unit. The post-processing circuit 40 converts the YUV signal into the RGB signal, and dithers to additionally express colors that cannot be expressed and parts passing through a palette when graphic data of a mode is less than 16 bpp.

The post-processing circuit 40 supports 4, 8, 16, and 32 bpp, and, when a tone level that can be expressed for a displaying apparatus is less than the tone level for the digital image, the post-processing circuit 40 supports the functions of error diffusion and dithering.

The first SDRAM controller circuit 50 is connected to the first system bus 8 and the second SDRAM controller circuit 20 is connected to the second system bus 9 to control an external SDRAM. SDRAM selects a double interleaving, and it is a DRAM with improved velocity as interior operation is processed with a pipeline method. Moreover, the SDRAM uses a burst mode. In the burst mode, a series of data bits is output quickly, set with the clock, after a first bit is accessed, and all bits to be accessed are accessed in order, and it is useful when the bits that are accessed following the first bit are in the same row as the first bit.

Separate SDRAM controllers are used for each system bus and data is input by considering the difference of velocity between the first system bus 8 and the second system bus 9, and thus a bottleneck can be reduced. The length of the data input to and output from the external SDRAM can be 16 bit or 32 bit.

The cache memory 60 connected between the controller 10 and the first system bus 8 allows the speed of a memory to be close to the velocity of the fastest memory by using the principle of locality. Simultaneously, the cache memory 60 is applied to yield a high amount of memory capacity with the inexpensive cost of semi-conductive memory.

When the ARM 1020E is used for the microprocessor 11, the processor has a data cache of 32K bytes and an instruction cache of 32K bytes included therein. Therefore, an on-chip cache of the microprocessor 11 has a function of a first cache and the cache memory 60 has a function of a second cache. The cache memory 60 can be used as a supplemental buffer for other circuits instead of being used as the second cache.

A plurality of peripheral controllers are connected to the peripheral device bus 7. For general purposes, a timer controller 200, a real time clock (RTC) controller 205, and an Interrupt controller 210 are connected to the peripheral device bus 7.

For communication, an UART (universal asynchronous receiver-transmitter) controller 240, an IrDA (infrared data association) controller 250, an I2C (inter IC control) controller 255, and an Ethernet controller 260 are connected to the peripheral device bus 7.

For controlling the memory card, a PCMCIA/CF (personal computer memory card interface association/compact flash) controller 220, an MMC/SD (multi-media card/secure disk) controller 225, and an MS (memory stick) controller 230 are connected to the peripheral device bus 7.

Furthermore, an AC'97 controller 265, a flash memory controller 270, a GPIO (general purpose input output) controller 235, an SSP (synchronous serial protocol) controller 275 for touch screen, and a PS2 controller 280 are connected to the peripheral device bus 7 in order to control external peripheral devices. The peripheral DMA circuit 80 that is connected to the first system bus 8 is used as a DMA for the external peripheral devices.

In the meantime, the first bridge DMA circuit 91 transmits data between the first system bus 8 and the second system bus 9, and the second bridge DMA circuit 90 transmits data between the first system bus 8 and the peripheral device bus 7.

The encoder/decoder circuit 70 connected to the first system bus 8 is not influenced largely by the size of an image that is input or displayed. Therefore, a slow clock signal can be used. On the contrary, the post-processing circuit 40 connected to the second system bus 9 should drive two display devices independently, e.g., an external LCD unit and an external CRT unit, but a high-speed clock signal should be used when the image displayed on the external LCD unit or the external CRT unit has a high magnitude.

Therefore, when circuits having different processing speeds commonly use a single system bus, each of the circuits using clock signals of different speeds, the speed of the entire system is set to the circuit using a low-speed clock signal, or a circuit using a high-speed clock signal is put on a stand-by status, and thus the efficiency of the entire system deteriorates.

For this reason, the first bridge DMA circuit 91 interfaces the data transmission between the first system bus 8 and the second system bus 9 having different processing velocities so that each system bus can operate at an independent processing speed, and simultaneously, data can be communicated easily between the two system buses. The first bridge DMA circuit 91 transmits data by the block, but it can also transmit smaller units of data.

Similarly, when data should be transmitted between the first system bus 8, which operates at a high speed, and the peripheral device bus 7, which operates at a slow speed, the speed of the first system bus 8 should be set to that of the peripheral device bus 7, i.e., the slow speed, thus the circuit connected with the first system bus 7 might be in the stand-by status. Therefore, the second bridge DMA circuit 90 having the same structure with the first bridge DMA circuit 91 is used in order to interface between the two buses at the different speeds.

Figure 2:
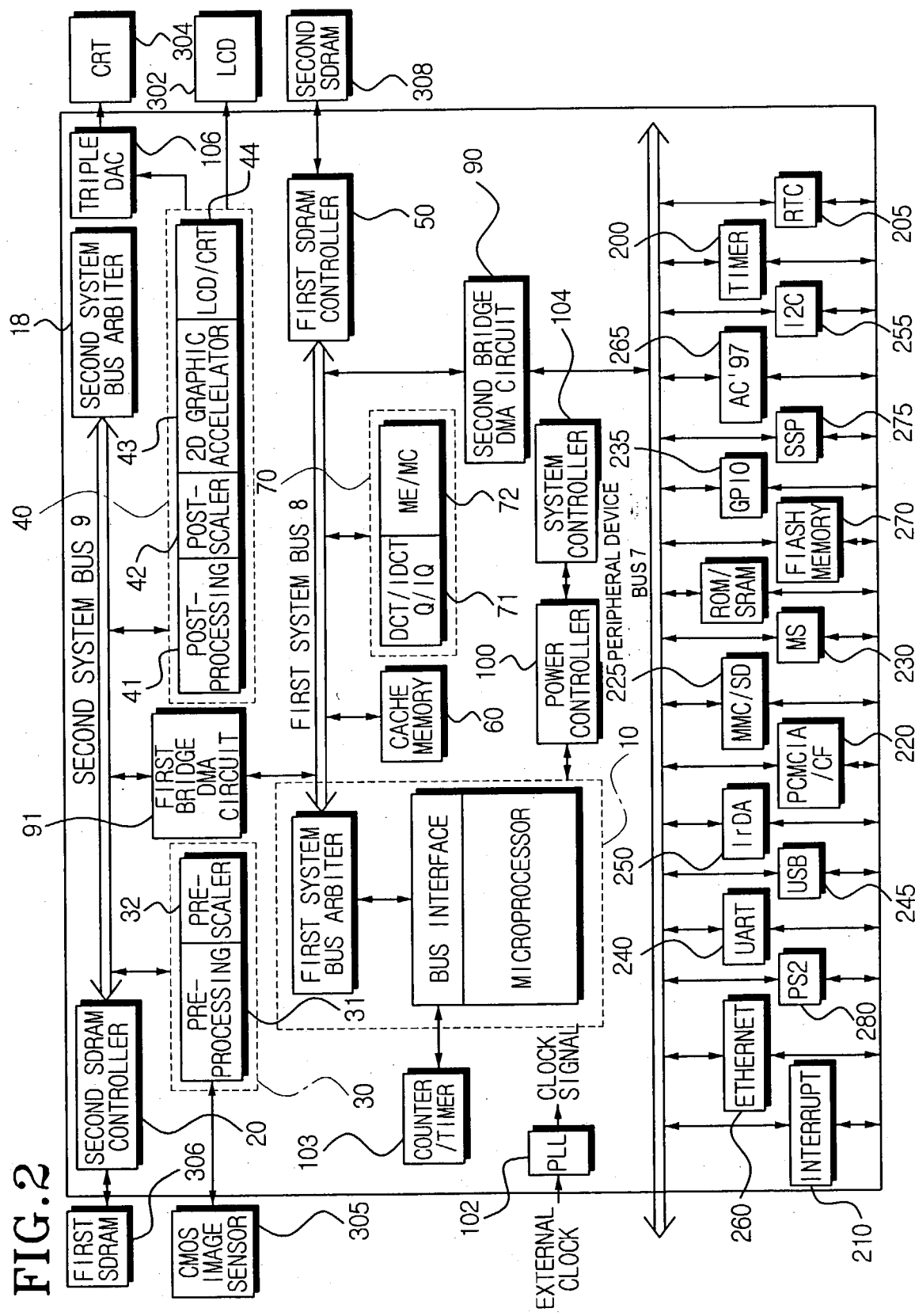
FIG. 2 is a block diagram showing an SOC processor according to embodiments of the present invention in great detail.

FIG. 2 is a block diagram showing an SOC processor for a multimedia device according to an embodiment of the present invention in great detail.

Referring to FIG. 2, the pre-processing circuit 30 comprises a pre-processing unit 31 and a pre-scaler unit 32 disposed therein. As described before, the pre-processing unit 31 generates a compressed input signal that can be compressed by the video coder after processing the external video signal. The pre-scaler unit 32 converts the magnitude of the input video signal into a desired magnitude.

The post-processing circuit 40 comprises a post-processing unit 41, a post-scaler unit 42, a 2D graphic accelerator 43 and an LCD/CRT controller 44.

The post-processing unit 41 processes the external video data and the graphic data to be output on the external LCD unit 302 or the external CRT unit 304, and the post-scaler unit 42 converts the magnitude of the output image into a desired magnitude.

The 2D graphic accelerator 43 processes the operation related to graphic processing using hardware. Because the processing of a graphic requires many operations, the graphic is not processed by the microprocessor 11 but by the 2D graphic accelerator 43, to improve efficiency.

The LCD/CRT controller 44 controls display functions in relation to the external LCD unit 302 or the external CRT unit 304 In an embodiment, the external LCD unit 302 and the external CRT unit 304 can be simultaneously driven for displaying the output image. In another embodiment, only one of the external LCD unit 302 and the external CRT unit 304 is driven for displaying the output image.

The encoder/decoder circuit 70 comprises a DCT/IDCT (discrete cosine transform/inverse DCT) and Q/IQ (quantization/inverse quantization) unit 71 and an ME/MC (motion estimation/motion compensation) unit 72.

The DCT/IDCT and Q/IQ unit 71 divides the single input image into square blocks of 8×8 pixels, and performs discrete cosine transforms on each block. After the transforming, the DCT/IDCT and Q/IQ unit 71 quantizes the image by dividing each modulus (the resultant value of a discrete cosine transformation) by a number defined in a quantization step and rounds the quotient of the division to the nearest value. The input signal can be compressed through the above steps.

When the compressed signal is decompressed, the DCT/IDCT and Q/IQ unit 71 performs an inverse quantization by multiplying each modulus of 8×8 pixel block with the number defined in the quantization step, and performs an inverse DCT for each inverse quantized block.

The ME/MC unit 72 performs compression and decompression using the information between the input image and the screen by estimating and compensating the motion. In other words, an ME circuit (not illustrated in FIG. 2) that is included in the ME/MC unit 72 calculates a motion vector of the input video signal, and an MC circuit (not illustrated in FIG. 2) that is included in the ME/MC unit 72 decompresses the input video signal by using a different value between pixel values generated from an IDCT circuit (not illustrated in FIG. 2) that is included in the DCT/IDCT and Q/IP unit 71 and a pixel value of a block compensated by the motion vector. The ME/MC unit 72 is used in conjunction with the DCT/IDCT and Q/IQ unit 71.

Concurrently, a power controller 100 blocks a clock signal supplied to an unnecessary circuit based on an operation mode and supplies the clock signal to a requiring circuit to be operated so that overall power consumption is reduced. When the power controller 100 stops the operation of the first SDRAM controller circuit 50 or the second SDRAM controller circuit 20, there should be a refresh operation to maintain the stored information and therefore, a self-refresh mode is operated from the moment that the clock signal is blocked and becomes low. A PLL (phase locked loop) 102 divides the external clock signal from outside of the SOC processor, and supplies the clock signal to any requiring circuits. The PLL 102 is controlled by the power controller 100. A system controller 104 provides an environment for the external peripheral devices such as a camera and an external LCD unit to be operated. A counter/timer 103 provides signals required for the operation of the microprocessor 11.

The operation of the SOC processor for the multimedia device according to the present invention described in FIGS. 1 and 2 will now be described.

First, the image signal input through a CMOS image sensor 305 is converted into an input signal that is compressed in the pre-processing circuit 30. Converted compressed input signals are transmitted to the encoder/decoder circuit 70 through the first bridge DMA circuit 91. The input signals are compressed and decompressed in the encoder/decoder circuit 70, and data is transmitted to the post-processing circuit 40 through the first bridge DMA circuit 90 after the above operation.

The input data is processed in the post-processing circuit 40, and the data is displayed on the external LCD unit 302. At the same time, the data can be displayed on the external CRT unit 306 after passing through a triple DAC (digital-to-analog converter) 106. When the data is stored and retrieved, external first SDRAM or external second SDRAM 308 are used by the first SDRAM controller circuit 50 or the second SDRAM controller circuit 20, respectively.

When control of external peripheral devices is desired, the microprocessor 11 sends required data to the peripheral device bus 7 through the first system bus 8 and the second bridge DMA circuit 90, and operates a required peripheral device controller.

The cache memory 60 can be used during the operation of the microprocessor 11. Moreover, when the microprocessor 11 receives a command that can be processed by a circuit having an independent function while the microprocessor 11 is executing other commands after interpreting them, the fact is informed to a corresponding circuit and the command is processed using hardware. Accordingly, the efficiency of the SOC can be improved.

As described so far, according to the present invention, when an SOC processor for a multimedia device is developed by using the existing microprocessor, plural independent system buses having different processing speeds are applied and the data transmission between the system buses are adjusted by using a bridge DMA. Therefore, it is possible to realize an SOC processor for a multimedia device having various functions with high efficiency and a short development period.

Furthermore, the entire power consumption can be reduced as the clock signals are supplied to a circuit that requires the clock signal in the SOC processor for a multimedia device.

The components included in the system may include memories, processors, and/or Application Specific Integrated Circuits ("ASICs"). Such memory may include a machine-readable medium on which is stored a set of instructions (i.e., software) embodying any one, or all, of the methodologies described herein. Software can reside, completely or at least partially, within this memory and/or within the processor and/or ASICs. For the purposes of this specification, the term "machine-readable medium" shall be taken to include any mechanism that provides (i.e., stores and/or transmits) information in a form readable by a machine (e.g., a computer). For example, a machine-readable medium includes read only memory ("ROM"), random access memory ("RAM"), magnetic disk storage media, optical storage media, flash memory devices, electrical, optical, acoustical, or other form of propagated signals (e.g., carrier waves, infrared signals, digital signals, etc.), etc.

Although an embodiment of the present invention has been described with respect to specific components, it will be understood by those skilled in the art that the present invention should not be limited to the described preferred embodiment, but various changes and modifications can be made within the spirit and the scope of the present invention. Accordingly, the scope of the present invention is not limited within the described range but the following claims and their equivalents.

What is claimed is:

1. A system on chip processor for multimedia devices, comprising;
   a pre-processing circuit to convert an external image signal into a compressed input signal;
   an encoder/decoder circuit to generate compressed data by compressing the compressed input signal and to output a coded image signal by decompressing the compressed data;
   a post-processing circuit to convert the coded image signal into a signal that is usable by an image displaying device;
   a first system bus connected with the pre-processing circuit and the post-processing circuit;
   a second system bus connected with the encoder/decoder circuit;
   a first bridge DMA circuit to mutually transmit data between the first system bus and the second system bus; and
   a controller to control the operation of the pre-processing circuit, the encoder/decoder circuit, the post-processing circuit, and the first bridge DMA circuit.

2. The system on chip processor of claim 1, further comprising:
   a plurality of peripheral device controllers to control external peripheral devices;
   a peripheral device bus connected with the plurality of peripheral device controllers; and
   a second bridge DMA circuit to transmit data between the first system bus and the peripheral device bus.

3. The system on chip processor of claim 2, wherein the plurality of peripheral device controllers include at least one of a TIMER controller, an RTC controller, an Interrupt controller, a PCMCIA/CF controller, an MMC/SD controller, an MS controller, a GPIO controller, a UART controller, a USB controller, an IrDA controller, an 12C controller, an Ethernet controller, an AC'97 controller, a Flash memory controller, an SSP controller, and a PS2 controller.

4. The system on chip processor of claim 1, wherein the controller comprises:
   a first system bus controller to control the use of the first system bus; and
   a second system bus arbiter to arbitrate the use of the second system bus.

5. The system on chip processor of claim 4, wherein the first system bus controller includes:
   a microprocessor;
   a first system bus arbiter to arbitrate the use of the first system bus;
   a bus interface to interface a bus signal between the microprocessor and the first system bus arbiter;
   a first controller bus to connect the microprocessor and the bus interface; and
   a second controller bus to connect the bus interface and the first system bus arbiter.

6. The system on chip processor of claim 5, wherein the microprocessor is an ARM1020E.

7. The system on chip processor of claim 5, wherein the first controller bus uses an AMBA protocol.

8. The system on chip processor of claim 1, further comprising a power controller to supply a clock signal to ones of the circuits that require the clock signal and to block the clock signal from other ones of the circuits that do not require the clock signal.

9. The system on chip processor of claim 1, further comprising a first memory controller connected with the first system bus to control input and output of data of a first external memory.

10. The system on chip processor of claim 9, further comprising a second memory controller connected with the second system bus to control input and output of data of a second external memory.

11. The system on chip processor of claim 10, wherein the second external memory comprises an SDRAM.

12. The system on chip processor of claim 1, further comprising a cache memory connected between the first memory controller and the first system bus.

13. The system on chip processor of claim 1, wherein the pre-processing circuit includes a pre-scaler unit to adjust a magnitude of an input image to a first predetermined magnitude.

14. The system on chip processor of claim 1, wherein the post-processing circuit includes an LCD controller to control display of an external LCD unit.

15. The system on chip processor of claim 1, wherein the post-processing circuit includes a CRT controller to control display of an external CRT unit.

16. The system on chip processor of claim 1, wherein the post-processing circuit includes a 2D graphic accelerator that is implemented in hardware to process graphic related operations.

17. The system on chip processor of claim 1, wherein the post-processing circuit includes a post-scaler unit to readjust a magnitude of an output image to a second predetermined magnitude.

18. The system on chip processor of claim 1, wherein the encoder/decoder circuit comprises:
   a DCT circuit to perform a discrete cosine transform operation on the compressed input signal and to output the transformed input signal;
   a quantization circuit to quantize the transformed input signal and to generate compressed data;
   an inverse quantization circuit to inverse quantize the compressed data and to output an inverse quantized signal; and
   an IDCT circuit to perform an inverse discrete cosine transform operation on the inverse quantized signal.

19. The system on chip processor of claim 1, wherein the encoder/decoder circuit comprises:
   an ME circuit to compress the compression input signal based on a correlation between display screens; and
   an MC circuit to decompress the compressed data regardless of the correlation between the display screens.

* * * * *

UNITED STATES PATENT AND TRADEMARK OFFICE
CERTIFICATE OF CORRECTION

PATENT NO. : 7,171,050 B2  Page 1 of 1
APPLICATION NO. : 10/361677
DATED : January 30, 2007
INVENTOR(S) : Jae-hyun Kim It is certified that error appears in the above-identified patent and that said Letters Patent is hereby corrected as shown below:

Column 9, Line 47, change "12C" to --I2C--.

Signed and Sealed this

First Day of May, 2007

JON W. DUDAS
*Director of the United States Patent and Trademark Office*